(12) United States Patent
Hagelgans et al.

(10) Patent No.: US 8,042,830 B2
(45) Date of Patent: Oct. 25, 2011

(54) DEVICE FOR SNAP-FASTENING AN AIRBAG UNIT IN A SUBASSEMBLY OF A MOTOR VEHICLE, ESPECIALLY IN A STEERING WHEEL

(75) Inventors: David Hagelgans, Aschaffenburg (DE); Alexander Weimer, Aschaffenburg (DE); Alexander Krieger, Kleinwallstadt (DE); Steffen Weigand, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 59 days.

(21) Appl. No.: 12/439,641

(22) PCT Filed: Aug. 6, 2007

(86) PCT No.: PCT/EP2007/058107
§ 371 (c)(1),
(2), (4) Date: Aug. 12, 2009

(87) PCT Pub. No.: WO2008/025641
PCT Pub. Date: Mar. 6, 2008

(65) Prior Publication Data
US 2009/0315304 A1   Dec. 24, 2009

(30) Foreign Application Priority Data
Sep. 1, 2006   (DE) .......................... 10 2006 041 734

(51) Int. Cl.
*B60R 21/20* (2006.01)
(52) U.S. Cl. ...................... 280/728.2; 280/731; 280/732
(58) Field of Classification Search ............... 280/728.2, 280/731, 732
See application file for complete search history.

(56) References Cited

U.S. PATENT DOCUMENTS

| 5,087,069 A | 2/1992 | Corbett et al. |
| 5,620,201 A | 4/1997 | Ricks |

(Continued)

FOREIGN PATENT DOCUMENTS

DE   296 02 630 U1   7/1996
(Continued)

OTHER PUBLICATIONS

English translation of the International Preliminary Report on Patentability (Chapter II of the Patent Cooperation Treaty) from the International Bureau of WIPO for International Application No. PCT/EP2007/058107 dated Apr. 16, 2009, 6 pages.

*Primary Examiner* — Toan C To
*Assistant Examiner* — Karen A Beck
(74) *Attorney, Agent, or Firm* — Fitch Even Tabin & Flannery

(57) ABSTRACT

A device is provided for snap-fastening an airbag unit in a subassembly of a motor vehicle, especially in a steering wheel of a motor vehicle, snap-in elements that are associated with each other being provided on the airbag unit and on the subassembly of the motor vehicle. In order to be able to snap-secure an airbag unit both to a plate-shaped subassembly and to a subassembly having a lateral wall, at least one snap-in hook is provided on the airbag unit or on the subassembly of the motor vehicle, at least one pivotable plastic snap-in clip being associated therewith on the other subassembly. The snap-in hook engages with said clip in at least one section thereof when in the snap-in position.

17 Claims, 10 Drawing Sheets

U.S. PATENT DOCUMENTS

| | | | |
|---|---|---|---|
| 5,664,801 A * | 9/1997 | Gray et al. | 280/728.2 |
| 5,979,929 A * | 11/1999 | Stanger et al. | 280/728.2 |
| 6,237,936 B1 * | 5/2001 | Quade et al. | 280/730.2 |
| 6,572,136 B2 * | 6/2003 | Inoue et al. | 280/728.2 |
| 7,410,188 B2 * | 8/2008 | Jeong | 280/728.2 |
| 7,690,678 B2 * | 4/2010 | Fujita et al. | 280/731 |
| 2001/0054810 A1 * | 12/2001 | Sakane et al. | 280/728.2 |
| 2003/0151236 A1 | 8/2003 | Xu et al. | |
| 2004/0061317 A1 * | 4/2004 | Ahlquist | 280/731 |
| 2004/0169358 A1 * | 9/2004 | Fujita et al. | 280/731 |
| 2005/0082795 A1 * | 4/2005 | Visconti et al. | 280/728.2 |
| 2008/0265550 A1 * | 10/2008 | Lisseman et al. | 280/728.2 |
| 2009/0206580 A1 * | 8/2009 | Torii | 280/728.2 |
| 2010/0219621 A1 * | 9/2010 | Sasaki et al. | 280/731 |

FOREIGN PATENT DOCUMENTS

| | | |
|---|---|---|
| DE | 296 21 295 U1 | 3/1997 |
| DE | 299 08 967 U1 | 12/1999 |
| DE | 20 2005 011 045 U1 | 11/2005 |
| EP | 0 790 153 A1 | 8/1997 |
| EP | 1 314 621 A1 | 5/2003 |
| FR | 2 780 688 A3 | 1/2000 |
| WO | 98/15431 A1 | 4/1998 |

* cited by examiner

DEVICE FOR SNAP-FASTENING AN AIRBAG UNIT IN A SUBASSEMBLY OF A MOTOR VEHICLE, ESPECIALLY IN A STEERING WHEEL

CROSS-REFERENCE TO RELATED APPLICATIONS

This application is a U.S. national phase application filed under 35 U.S.C. §371 of International Application PCT/EP2007/058107, filed on Aug. 6, 2007, designating the United States, which claims priority from DE 10 2006 041 734.8, filed Sep. 1, 2006, which are hereby incorporated herein by reference in their entirety.

FIELD OF THE INVENTION

The invention relates to a device for snap-fastening an airbag unit in a subassembly of a motor vehicle, especially in a steering wheel.

BACKGROUND OF THE INVENTION

Devices for fastening an airbag unit in a subassembly of a motor vehicle are known. For example, an airbag module in which the airbag unit has on its outside elastically deformable snap-in hooks which can engage behind latching sections on the inside of the lateral wall of the airbag housing is known from EP 1 314 621 A1. In this case, the airbag unit is introduced into the airbag housing from above. As soon as the snap-in hooks reach the region of the latching sections, the snap-in hooks slide along the latching sections, being deformed elastically in the direction of the lateral wall of the airbag unit. Upon reaching the end position of the airbag unit in the airbag housing, the snap-in hooks spring back and engage below the latching sections of the airbag housing. The airbag module is thereby fixed in the airbag housing. This device has the disadvantage that the subassembly to which the airbag unit is to be snap-fastened must have a lateral wall on which the latching sections can be arranged. It is not possible to connect the airbag unit to a flat plate.

A device for snap-fastening an airbag unit in an airbag housing is further known from U.S. Pat. No. 5,620,201. In this device the airbag unit has a snap-in mechanism on each opposite side. This snap-in mechanism has a housing in which is mounted a spring-loaded pin which, during installation of the airbag unit, is pressed back against the spring force by the respective lateral wall of the airbag housing and slides along the inner wall of the airbag housing until it is pressed by the spring into an opening of the airbag housing, whereby the airbag unit is locked to the airbag housing. Locking to a motor vehicle subassembly which does not have lateral walls is also possible. In this case, an angled portion which has a perpendicular section replacing the lateral wall must be mounted on the subassembly for each snap-in mechanism. In the case of this device, too, therefore, a lateral wall or a corresponding substitute must be provided in order to fix the airbag unit.

SUMMARY OF THE INVENTION

It is the object of the invention to snap-fasten an airbag unit both to a plate-shaped subassembly and to a subassembly which has a lateral wall.

This object is achieved according to the invention by the features described hereinafter.

In a device for snap-fastening an airbag unit in a subassembly of a motor vehicle, especially in a steering wheel of a motor vehicle, snap-in elements which are associated with each other being provided on the airbag unit and on the subassembly of the motor vehicle, at least one snap-in hook is provided according to the invention on the airbag unit or on the subassembly of the motor vehicle. Furthermore, at least one pivotable plastic snap-in clip which engages with the snap-in hook in at least one region in the snap-in position is associated with said snap-in hook.

This device has the advantage that the snap-in hooks and the associated pivotable plastic snap-in clip can be arranged at any positions of the airbag unit and the subassembly of the motor vehicle. If a steering wheel on which the horn is actuated by pressing down the airbag unit is provided as the subassembly of the motor vehicle, as a result of the inventive type of snap-fastening extraneous noises are caused neither when the airbag unit is pushed down nor when it springs back.

The plastic snap-in clip is preferably mounted pivotably at one end, adjoining which end it has a deformable section adjacent to which is a swivelable section, a stop on the subassembly of the motor vehicle being associated with the deformable section and the region which can be engaged being provided on the swivelable section.

It is advantageous if a side of the deformable section associated with the stop on the subassembly of the motor vehicle and a side of the swivelable section associated with the snap-in hook extend obliquely away from one another, starting from the bearing of the plastic snap-in clip; that is, the corresponding side of the deformable section is disposed obliquely in the direction of the stop on the subassembly of the motor vehicle and the corresponding side of the swivelable section is disposed obliquely in the direction of the snap-in hook.

The swivelable section preferably has a greater thickness than the deformable section.

In an embodiment, the bearing of the plastic snap-in clip is provided on a plate-shaped subassembly of the motor vehicle or on a plate-shaped section of a subassembly of the motor vehicle which is provided with a lateral wall, at a distance from this subassembly or this section, and the deformable and swivelable sections project into an opening of this subassembly or of this section, the deformable section resting against the wall of the opening.

In a further embodiment, the bearing of the plastic snap-in clip is provided on at least one lateral wall of the subassembly of the motor vehicle, at a distance from this lateral wall, and the deformable section rests against the lateral wall.

In a first embodiment, two at least partially hollow-cylindrical bearings, into which two cylindrical projections of the plastic snap-in clip are insertable, are provided for mounting the plastic snap-in clip. The bearings are preferably open on one side in the manner of claws.

In a second embodiment, the bearing for the plastic snap-in clip is cylindrical and the plastic snap-in clip has a recess engaging over this bearing, which recess is at least partially hollow-cylindrical and is open on one side.

The snap-in hook on the airbag unit and the bearing for the plastic snap-in clip are preferably provided on the subassembly of the motor vehicle.

In a further configuration of the invention it is provided that the swivelable section of the plastic snap-in clip has an oblique face associated with the snap-in hook, which oblique face is disposed such that the snap-in hook is swiveled by an increasing amount when it is pressed on this face.

In order to connect the airbag unit to the subassembly of the motor vehicle three snap-in hooks are preferably provided, plastic snap-in clips being associated with two snap-in hooks while an undercut in the opposite subassembly is associated with the third snap-in hook. However, is also possible that three snap-in hooks are provided for connecting the airbag unit to the subassembly of the motor vehicle, a plastic snap-in clip being associated with one snap-in hook while a respective undercut in the opposite subassembly is associated with the two further snap-in hooks.

The skeleton of the steering wheel is preferably provided as the subassembly of the motor vehicle to which the airbag unit is fastened.

In the case of an airbag unit arranged in a steering wheel, the airbag unit is movable in the direction of the steering wheel hub or of a contact bridge against the pressure of at least one spring in order to actuate at least one horn contact.

It is advantageous if the face of the swivelable section of the plastic snap-in clip associated with the snap-in hook has towards at least one side an oblique face such that the swivelable section can be pressed away from the snap-in hook by means of a pin in order to unlock the connection between the airbag unit and the subassembly of the motor vehicle.

Furthermore, it is also possible for the face of the snap-in hook associated with the swivelable section of the plastic snap-in clip to have towards at least one side an oblique face such that the swivelable section can be pressed away from the snap-in hook by means of a pin in order to unlock the connection between the airbag unit and the subassembly of the motor vehicle.

BRIEF DESCRIPTION OF THE DRAWINGS

The invention will be explained with reference to exemplary embodiments and to drawings, in which.

DETAILED DESCRIPTION OF THE PREFERRED EMBODIMENTS

Figure 1:
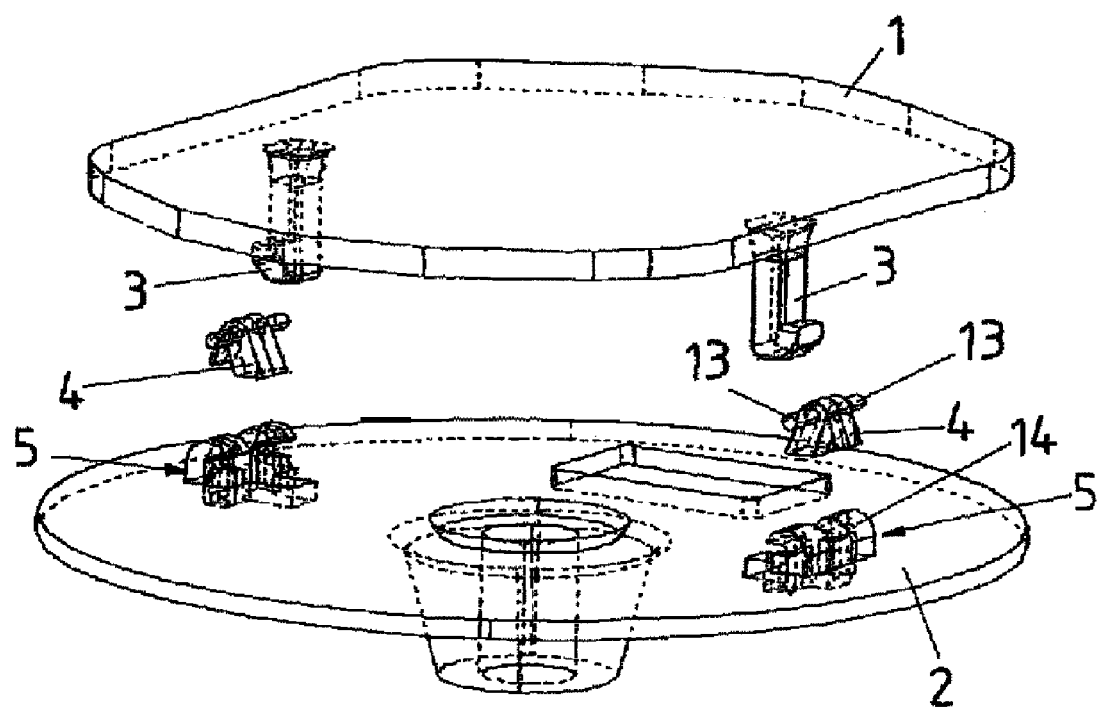
FIG. 1 is a perspective view of a device according to the invention in a first embodiment.

FIG. 1 shows a lower plate-shaped portion of an airbag unit 1 which is to be snap-fastened to a skeleton part 2, for example a steering wheel hub or a contact bridge fastened to the steering wheel. For this purpose the airbag unit has on its underside snap-in hooks 3 with which plastic snap-in clips 4 on the skeleton part 2 are associated, which snap-in clips 4 have cylindrical projections 13 which are mounted pivotably in bearings 5 (FIG. 2) on the skeleton part 2.

Figure 2:
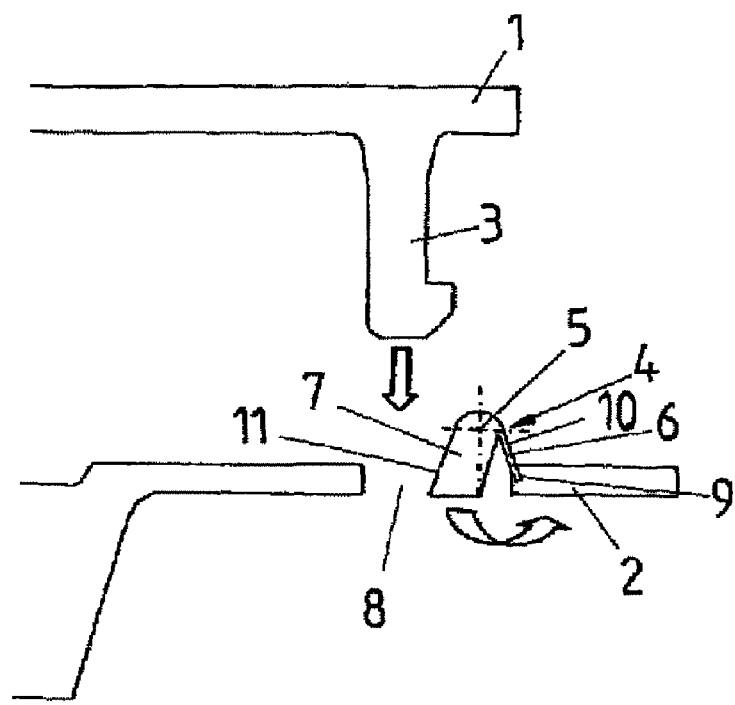
FIG. 2 shows the snap-in operation of the inventive device.
Figure 3:
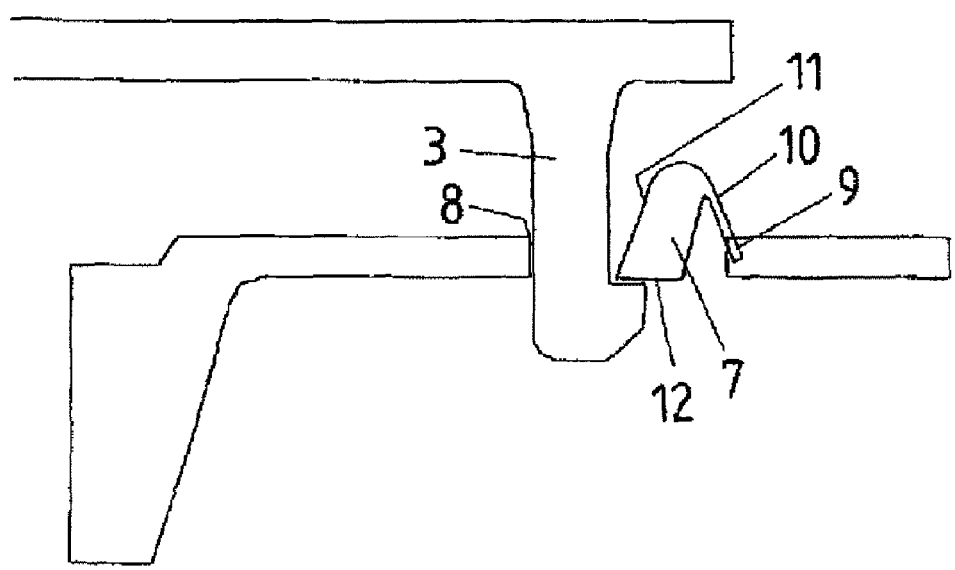
FIG. 3 shows the snap-in position of the inventive device.

It can be seen from FIGS. 2 and 3 that the plastic snap-in clips 4 have a deformable section 6 and a swivelable section 7. The plastic snap-in clips 4 are mounted in such a manner that the sections 6 and 7 project into an opening 8 of the skeleton part 2. A side 10 of the deformable section 6 associated with a stop 9 of the opening 8 runs obliquely from the bearing 5 in the direction of the stop 9. A side 11 of the swivelable section 7 associated with the snap-in hook 3 runs obliquely from the bearing 5 in the direction of the snap-in hook 3. In order to snap-fasten the airbag unit 1 to the skeleton part 2, the airbag 1 is pushed in the direction of the skeleton part 2, as is indicated by the upper arrow in FIG. 2. As this is done, each snap-in hook 3 first comes into contact with the swivelable section 7 of one of the plastic snap-in clips 4. As the snap-in hooks 3 continue to be pressed against the plastic snap-in clips, the deformable section 6, the end of which rests against the wall of the opening 8, is deformed in its region adjacent to the bearing, whereby the swivelable section 7 is swiveled in the direction of the deformable section 6, as is represented by the curved arrow in FIG. 2. As this happens, the snap-in hook 3 engages in the opening 8. As soon as the snap-in hook has passed the lower end of the swivelable section 7 the latter springs back, so that the snap-in position represented in FIG. 3 is achieved.

In this position the left side of the snap-in hook 3, in the illustration in FIG. 3, rests against the wall of the opening 8. The hook is therefore prevented from sliding away to the side. When the airbag unit 1 is tensioned, for example during triggering of the airbag, the plastic snap-in clip 4 is only wedged further into the snap-in hook, since the swivelable section 7 disposed obliquely in the direction of the snap-in hook is pressed by the force acting on the underside 12 of said section 7 against the snap-in hook 3.

Figure 4:
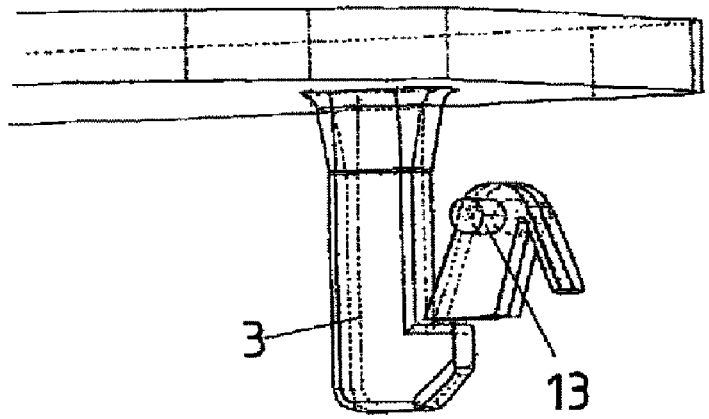
FIG. 4 is an isolated representation of a snap-in hook and a plastic snap-in clip.
Figure 5:
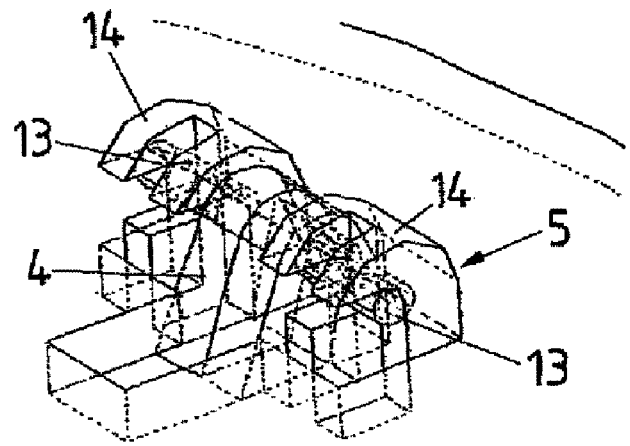
FIG. 5 is a perspective view of the mounting of the plastic snap-in clip of the first embodiment.

One of the cylindrical projections 13 of the plastic snap-in clip 4 can be seen, in particular, in FIG. 4. FIG. 5 shows the bearing 5 for the projections 13. This bearing has two partially hollow-cylindrical bearings 14 spaced at a distance from one another. These bearings 14 are open at one side, so that the cylindrical projections 13 of the plastic snap-in clip can be pushed in. The plastic snap-in clip 4 is then located between the bearings 14, as can be seen in FIG. 5.

Figure 6:
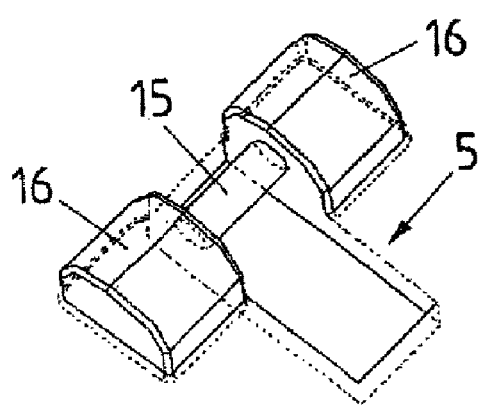
FIG. 6 is a perspective representation of a bearing for a plastic snap-in clip in a second embodiment.
Figure 7:
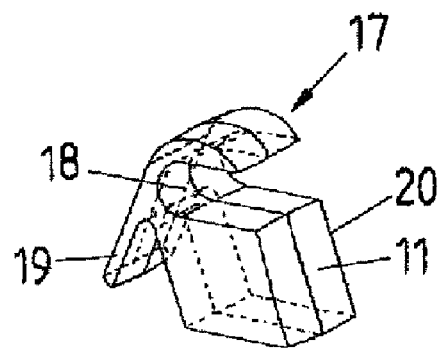
FIG. 7 shows a second embodiment of the plastic snap-in clip.

FIG. 6 shows a bearing 5 for a second embodiment of the plastic snap-in clip. In this case the bearing 5 has a cylindrical bearing 15 between two brackets 16. Associated with this bearing is a plastic snap-in clip 17 illustrated in FIG. 7, which has a partially hollow-cylindrical opening 18 which is open on one side in the manner of a claw. The plastic snap-in clip 17 has a deformable section 19 and a swivelable section 20.

Figure 8:
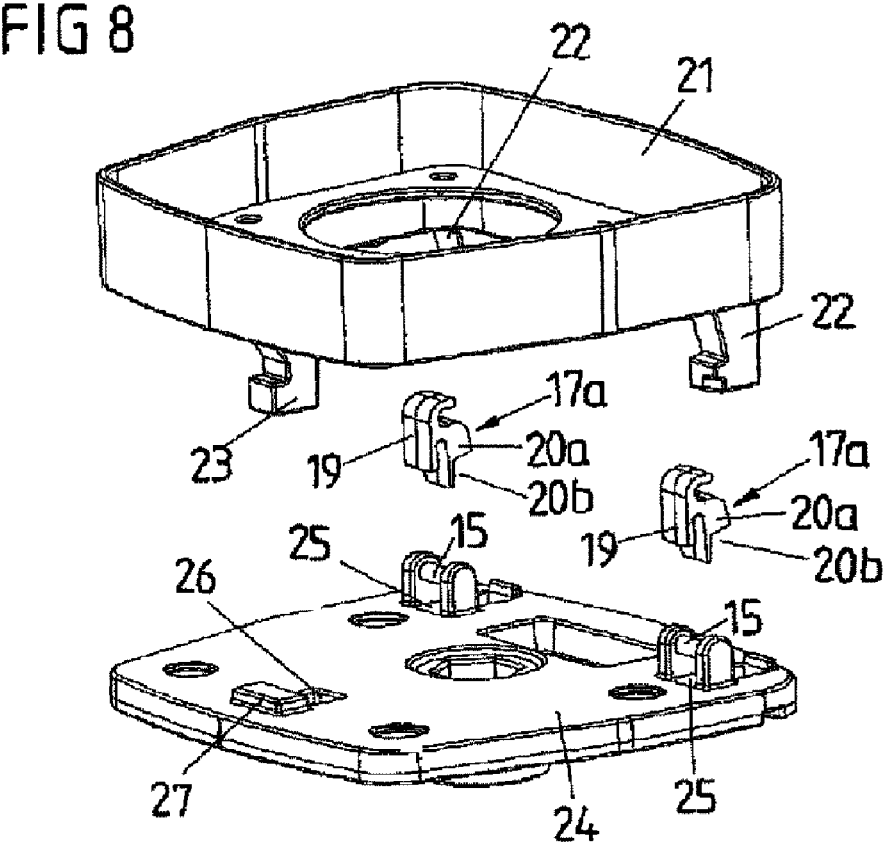
FIG. 8 is a perspective view of an inventive device with the second embodiment of the plastic snap-in clip.

FIG. 8 shows a device with a variant 17a of this second embodiment of the plastic snap-in clip. In the case of this plastic snap-in clip 17a, a swivelable section 20a is provided which has an upper wider region and the lower narrower region, so that a gap 20b is formed. An airbag unit 21 has two snap-in hooks 22 and a further snap-in hook 23. Associated with each of the hooks 22 is one of the plastic snap-in clips 17a, which are each mounted in one of the cylindrical bearings 15 which in turn are provided on a skeleton part 24. In this case the deformable section 19 and the swivelable section 20a of each plastic snap-in clip 17a project into an opening 25 of the skeleton part 24. An opening 26 which is partially covered by a part 27, so that an undercut is formed, is associated with the snap-in hook 23.

Figure 9:
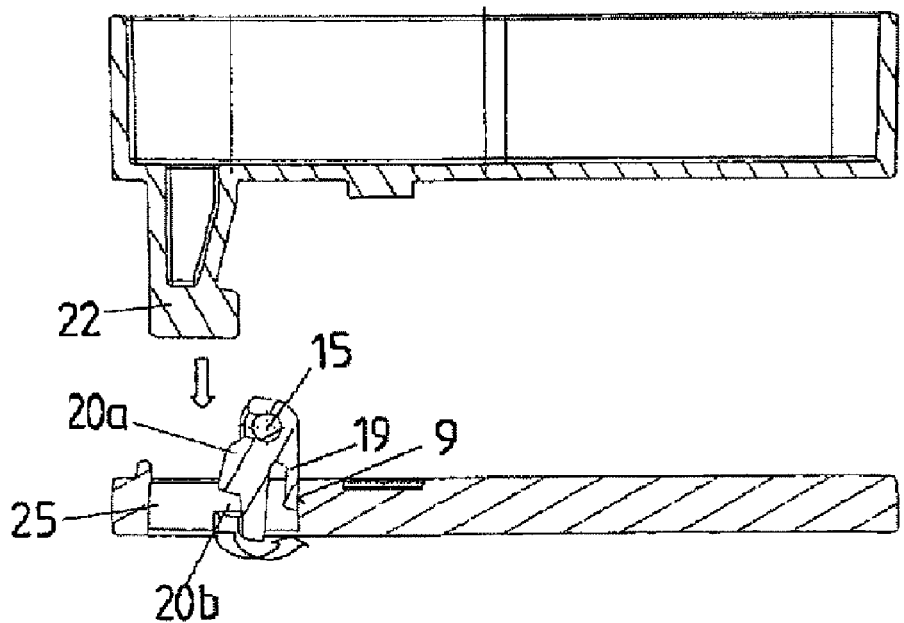
FIG. 9 shows the snap-in operation of the embodiment according to FIG. 8.
Figure 10:
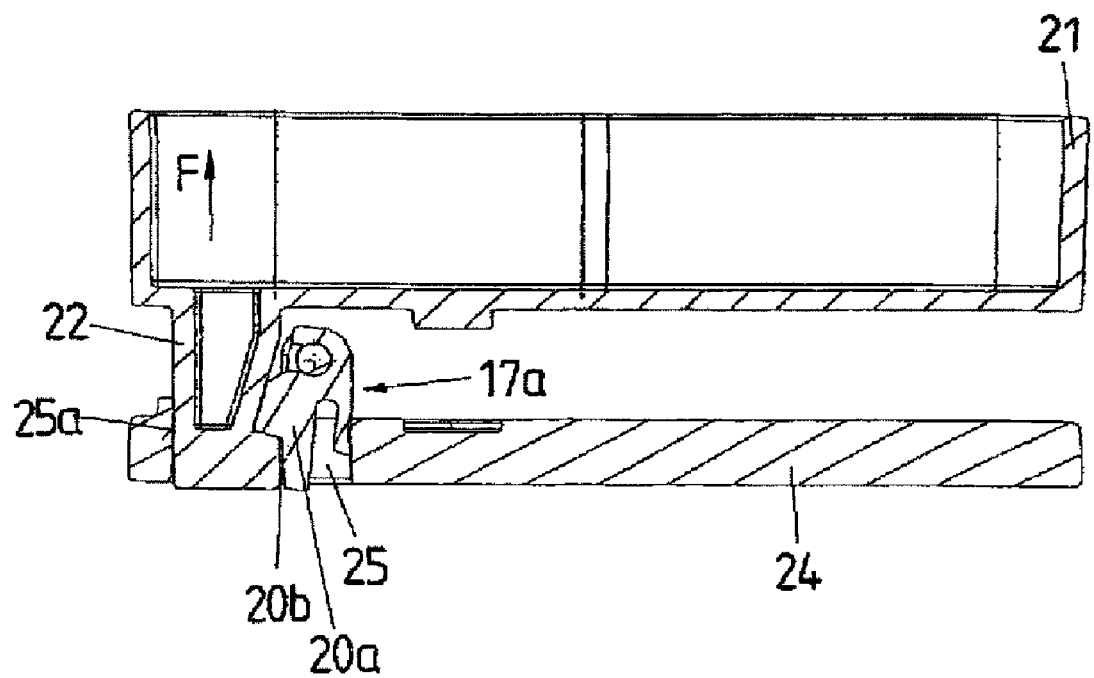
FIG. 10 shows the snap-in position of the embodiment according to FIG. 8.

During installation of the airbag unit 21, the hook 23 is first introduced into the opening 26 until the hook 23 engages under the part 27. The airbag unit 21 is then moved with the hooks 22 in the direction of the swivelable sections 20a, as is indicated by the arrow in FIG. 9. As it is pressed down further, each hook 22 engages in the associated opening 25 and swivels the section 20a in the direction of the deformable section 19 until the hook 22 engages in the gap 20b, as shown in FIG. 10. In this position the airbag unit 21 is locked to the skeleton part 24, the hooks 22 resting on one side against the respective plastic snap-in clip 17a and on the other against the lateral wall 25a of the respective opening 25. In this embodiment, too, upon deployment of the airbag a self-blocking between the hook 22 and the plastic snap-in clip 17a is produced by the force F which is generated.

Figure 11:
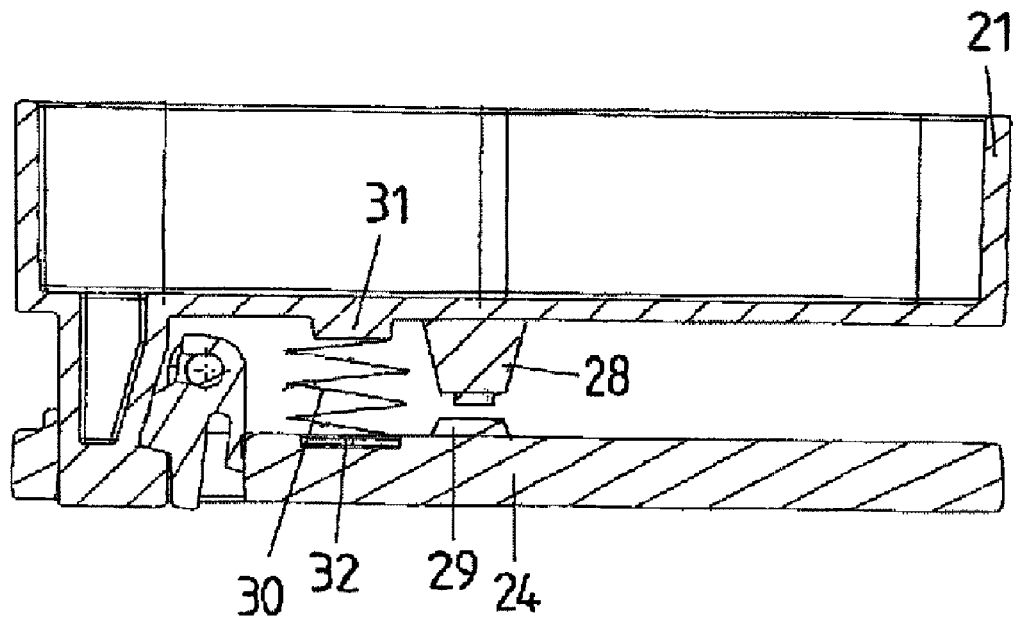
FIG. 11 shows the snap-in position of the embodiment according to FIG. 8 with a horn contact.
Figure 12:
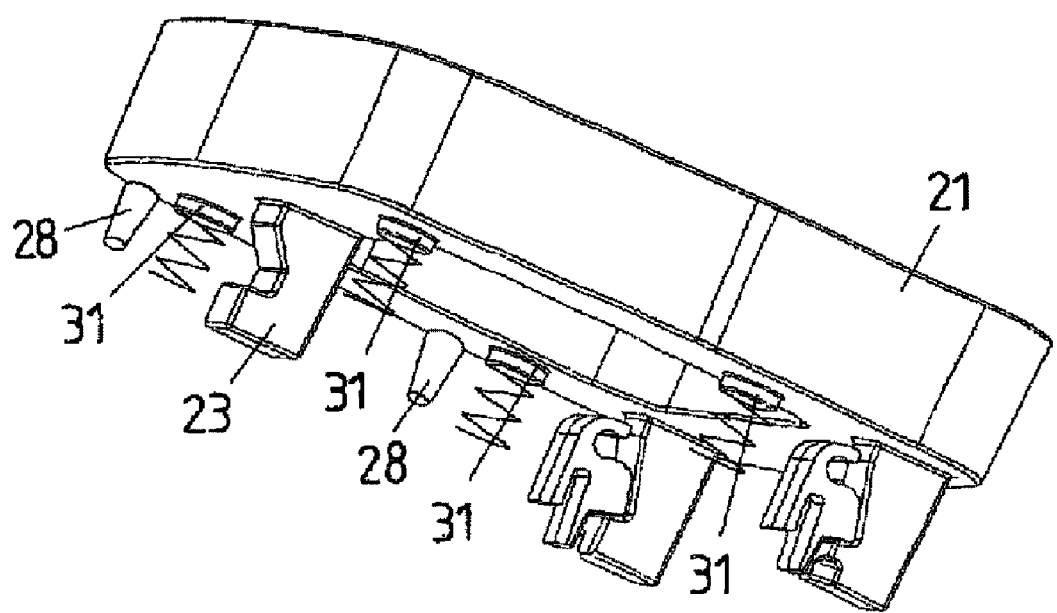
FIG. 12 is a view in which the coordination of the snap-in hooks and the plastic snap-in clip can be seen.
Figure 13:
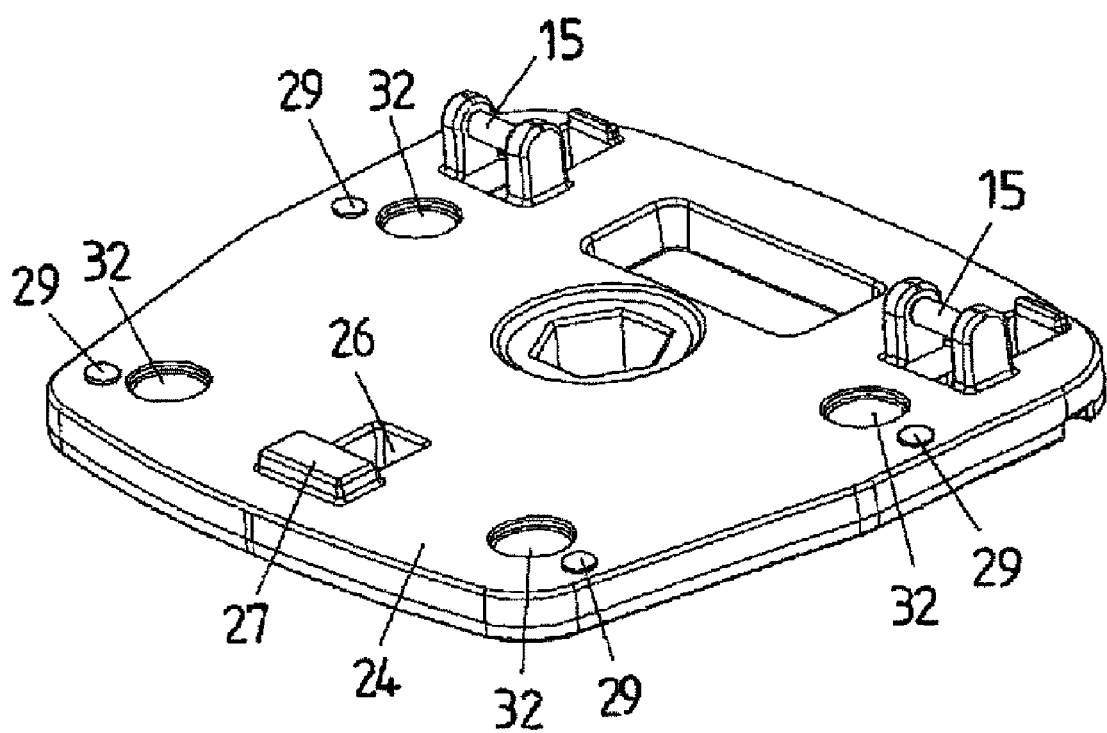
FIG. 13 is a perspective view of a part of a steering wheel with bearings for the plastic snap-in clip of the second embodiment.

FIG. 11 shows an embodiment which is modified, as compared to the embodiment of FIG. 10, in that at least one horn contact 28, with which an opposed contact 29 on the skeleton part 24 is associated, is provided on the airbag unit 21. The distance between these two contacts is ensured by four springs 30, which extend between nipples 31 on the airbag unit 21 and recesses 32 in the skeleton part 24. One of these springs can be seen in FIG. 11. The position of the nipples 31 can be seen in FIG. 12 and the position of the recesses 32 in FIG. 13. In the latter figure four opposed contacts 29 can also be seen, with which are associated four horn contacts 28, only two of which are shown in FIG. 12. Self-evidently, a different number of horn contacts and corresponding opposed contacts may be provided. In this embodiment the hook 23 below the part 27 can be pressed downwards, whereby the airbag unit is swiveled about the bearings 15 and the horn contacts 28 are pressed against the opposed contacts 29.

Figure 14:
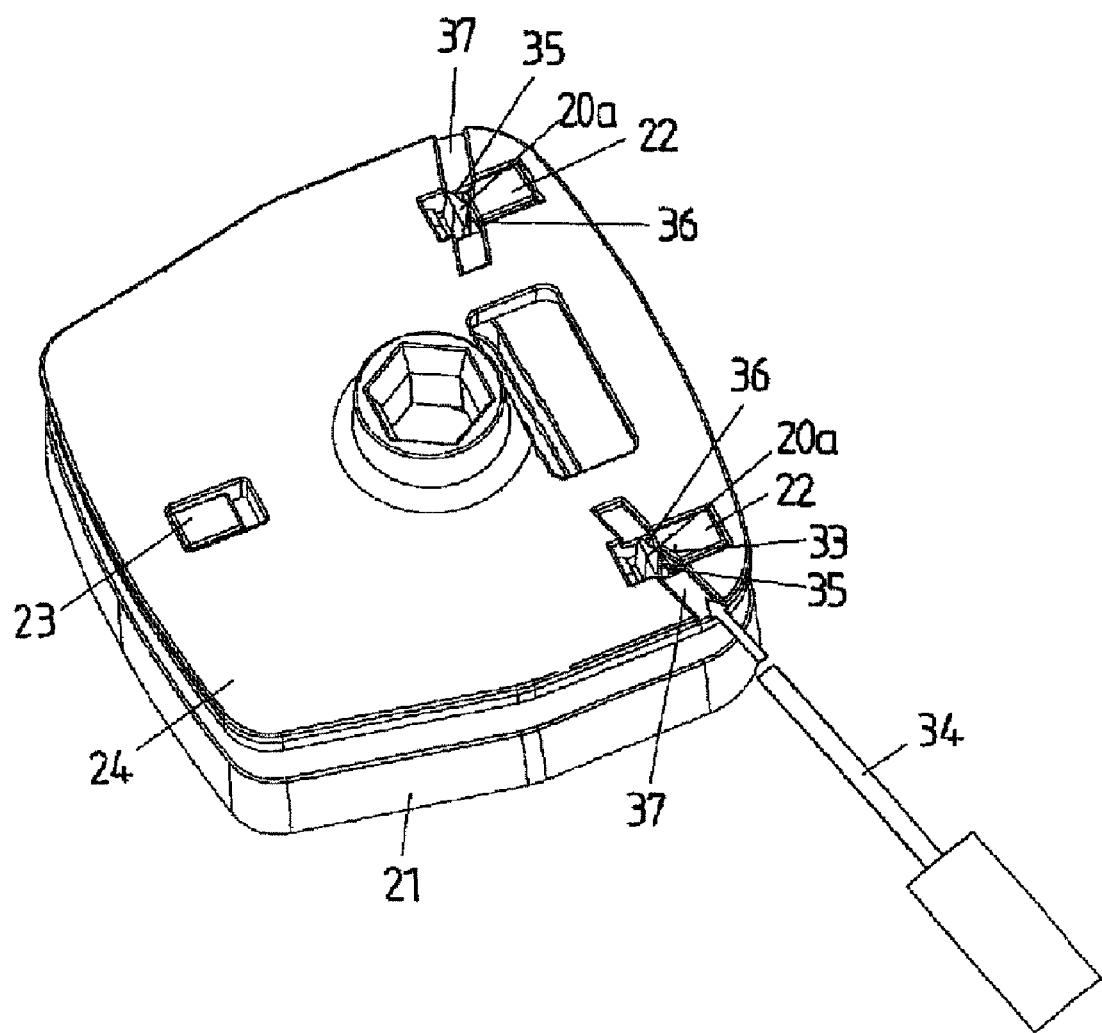
FIG. 14 is a perspective view of the underside of a snap-fastened device with a pin for unlocking.

FIG. 14 shows the underside of the airbag unit 21 and of the skeleton part 24 in the position in which they are connected to one another. The undersides of the snap-in hooks 22, 23 and of the swivelable sections 20a of the plastic snap-in clips 17a can be seen.

The face of the snap-in hook 22 associated with the respective swivelable sections 20a of the plastic snap-in clips 17a has an oblique face 33 such that each swivelable section 20a can be pushed away from the respective snap-in hook 22 by means of a pin 34 in order to unlock the connection between the airbag unit 21 and the skeleton part 24. In the embodiment of FIG. 14, the swivelable sections 20a additionally have oblique faces 35, 36, whereby unlocking is further facilitated. For guidance of the pin 34, a lateral channel 37 is provided on the underside of the skeleton part 24 in the region of each swivelable section 20a.

Figure 15:
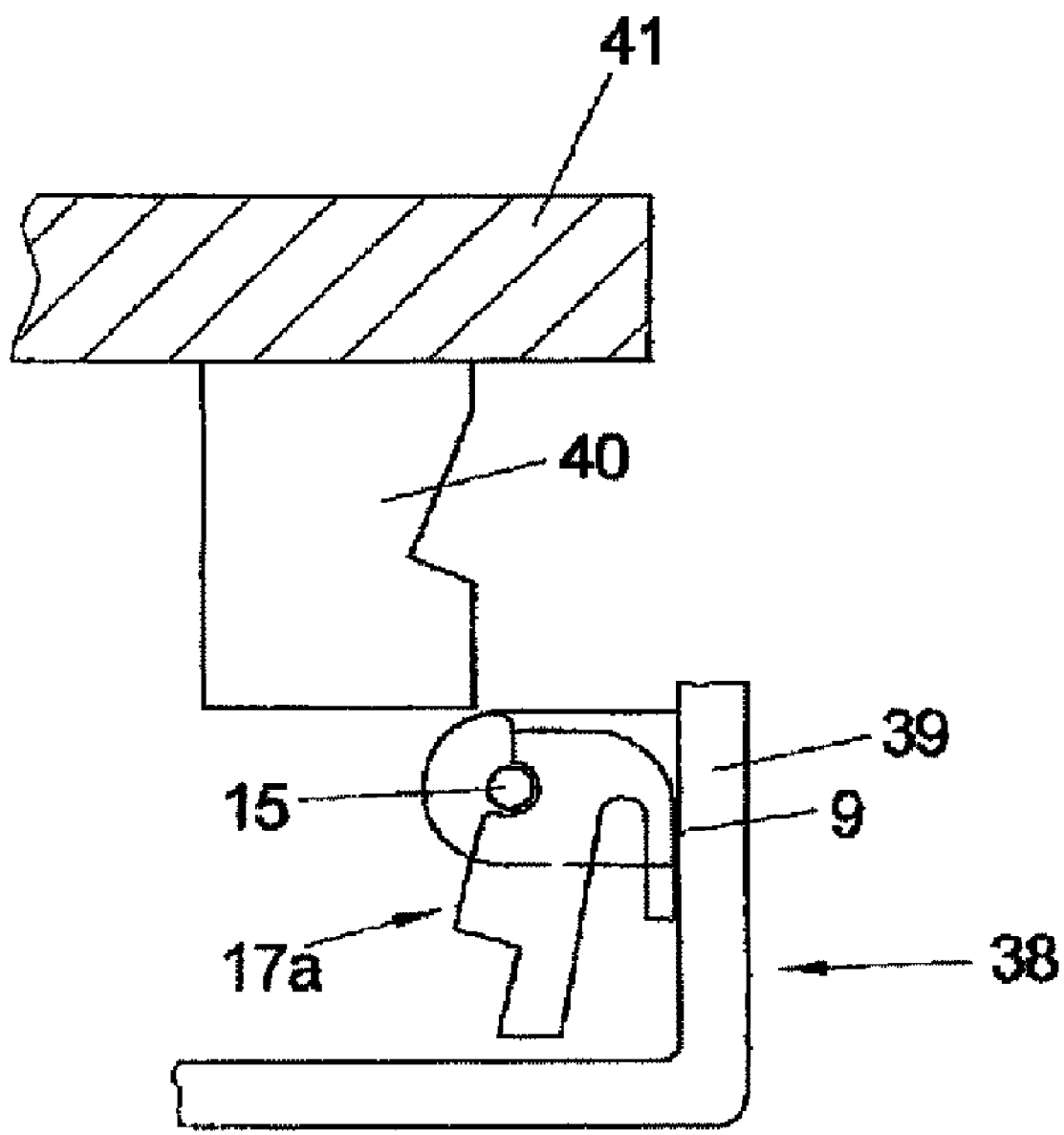
FIG. 15 shows an embodiment in which the bearing for the plastic snap-in clip is mounted on a lateral wall.

In the embodiment of FIG. 15, a skeleton part 38 with lateral walls 39 is provided in place of a plate-shaped skeleton part. In this embodiment the cylindrical bearings 15 are mounted on the lateral walls 39. FIG. 15 shows a bearing with a plastic snap-in clip 17a. Associated with the latter is a snap-in hook 40 on an airbag unit 41. After latching, the airbag unit 41 is located between the lateral walls 39, so that the airbag unit is securely locked. The opposite lateral wall 39 is not shown in FIG. 15.

Figure 16:
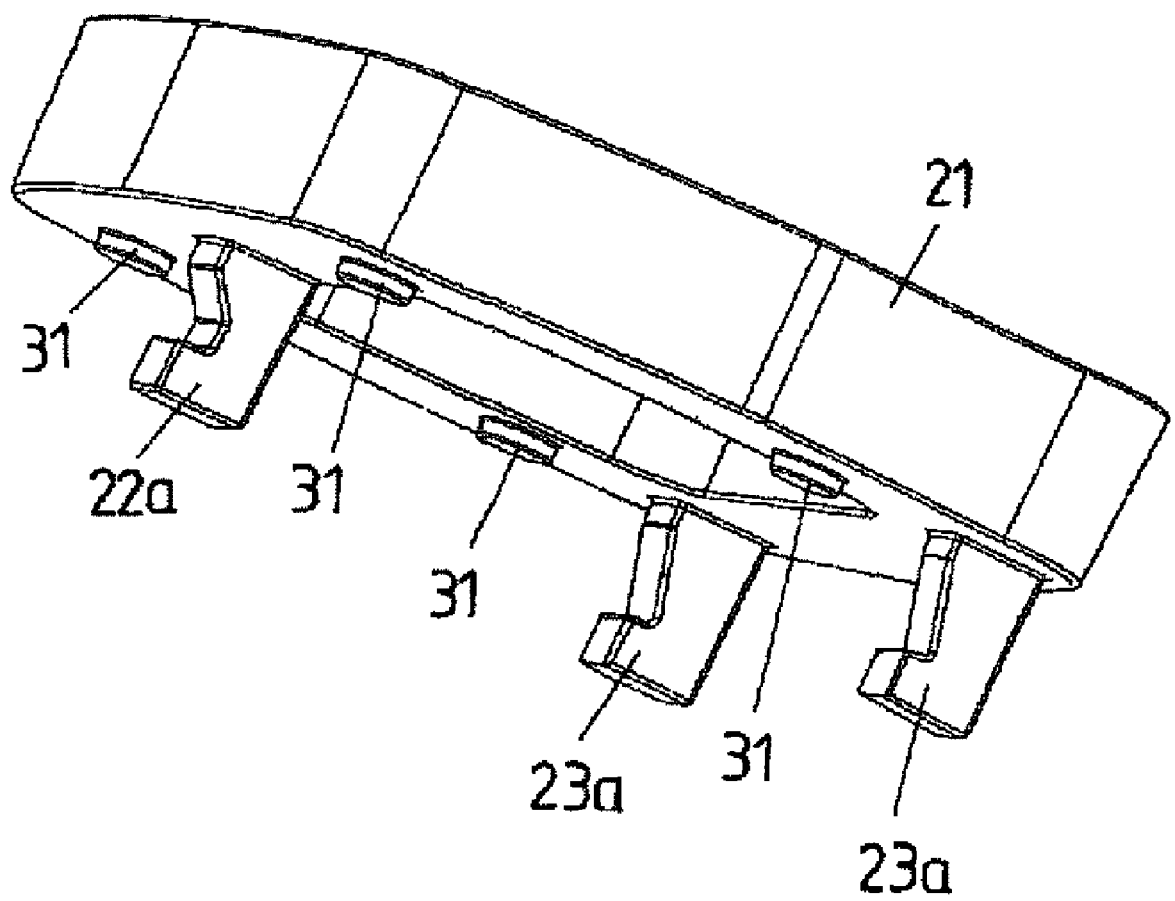
FIG. 16 shows an embodiment in which one hook for a snap-in clip and two hooks for an undercut are provided.

FIG. 16 shows an embodiment in which one snap-in hook 22a is associated with a plastic snap-in clip (not shown) and two snap-in hooks 23a are associated with respective undercuts (not shown). The plastic snap-in clip corresponds to the plastic snap-in clips shown in FIG. 12, and the undercuts correspond to the undercut shown in FIG. 12, which is formed by an opening 26 and a part 27.

The invention claimed is:

1. A device for snap-fastening an airbag unit in a subassembly of a motor vehicle, the device comprising: snap-in elements associated with one another being provided on the airbag unit and on the subassembly of the motor vehicle, at least one snap-in hook is provided on the airbag unit or on the subassembly of the motor vehicle, and in that at least one single-piece, pivotable plastic snap-in clip on the respective other subassembly is associated with the snap-in hook and engages therewith in at least one region in the snap-in position, in that the plastic snap-in clip is mounted pivotably at one end thereof, characterized in that the plastic snap-in clip has adjoining said end a deformable section adjacent to which is a swivelable section so that the single-piece, pivotable plastic snap-in clip includes both the deformable section and the swivelable section, a stop on the subassembly of the motor vehicle being associated with the deformable section and the region which can be engaged being provided on the swivelable section so that as the snap-in hook engages the swivelable section for snap-fastening of the airbag unit to the motor vehicle subassembly, the deformable section is deformed and the swivelable section swivels at said end of the single-piece snap-in clip with the swivelable section swiveling toward the deformed deformable section of the single-piece snap-in clip.

2. The device as claimed in claim 1, characterized in that a side of the deformable section associated with the stop on the subassembly of the motor vehicle, and a side of the swivelable section associated with the snap-in hook, extend obliquely away from one another, starting from a bearing of the plastic snap-in clip.

3. The device as claimed in claim 1, characterized in that the swivelable section has a greater thickness than the deformable section.

4. The device as claimed in claim 1, characterized in that a bearing of the plastic snap-in clip is provided on a plate-shaped subassembly of the motor vehicle or on a plate-shaped section of a subassembly of the motor vehicle provided with a lateral wall, at a distance from this subassembly or this section, and in that the deformable section and the swivelable section project into an opening of this subassembly or this section, the deformable section resting against the wall of the opening.

5. The device as claimed in claim 1, characterized in that a bearing of the plastic snap-in clip is provided on at least one lateral wall of the subassembly of the motor vehicle at a distance from the one lateral wall, and in that the deformable section rests against the one lateral wall.

6. The device as claimed in claim 1, characterized in that two at least partially hollow-cylindrical bearings are provided for mounting the plastic snap-in clip, into which bearings two cylindrical projections of the plastic snap-in clip are insertable.

7. The device as claimed in claim 6, characterized in that the bearings are open on one side in the manner of claws.

8. The device as claimed in claim 1, characterized in that a bearing for the plastic snap-in clip is cylindrical and in that the plastic snap-in clip has a recess which engages over this bearing and is at least partially hollow-cylindrical.

9. The device as claimed in claim 8, characterized in that the recess is open on one side in the manner of a claw.

10. The device as claimed in claim 1, characterized in that the snap-in hook is provided on the airbag unit and a bearing for the plastic snap-in clip is provided on the subassembly of the motor vehicle.

11. The device as claimed in claim 1, characterized in that the swivelable section of the plastic snap-in clip has, associated with the snap-in hook, an oblique face which is disposed such that the snap-in hook is swiveled by an increasing amount as it is pressed on this face.

12. The device as claimed in claim 1, characterized in that three snap-in hooks are provided for connecting the airbag unit to the subassembly of the motor vehicle, two snap-in hooks being associated with plastic snap-in clips while an undercut in the opposite subassembly is associated with the third snap-in hook.

13. The device as claimed in claim 1, characterized in that three snap-in hooks are provided for connecting the airbag unit to the subassembly of the motor vehicle, one snap-in hook being associated with a plastic snap-in clip while a respective undercut in the opposite subassembly is associated with each of the two further snap-in hooks.

14. The device as claimed in claim 1, characterized in that a skeleton of a steering wheel is provided as the subassembly of the motor vehicle for fastening of the airbag unit.

15. The device as claimed in claim 1, characterized in that the airbag unit is movable in a steering wheel in the direction of a steering wheel hub or of a contact bridge against the pressure of at least one spring in order to actuate at least one horn contact.

16. The device as claimed in claim 1, characterized in that a face of the swivelable section of the plastic snap-in clip associated with the snap-in hook has towards at least one side an oblique face such that the swivelable section can be pressed away from the snap-in hook by means of a pin in order to unlock the connection between the airbag unit and the subassembly of the motor vehicle.

17. The device as claimed in claim 1, characterized in that a face of the snap-in hook associated with the swivelable section of the plastic snap-in clip has towards at least one side an oblique face such that the swivelable section can be pressed away from the snap-in hook by means of a pin in order to unlock the connection between the airbag unit and the subassembly of the motor vehicle.

* * * * *